A. V. ROWE.
LINE DRIVE ATTACHMENT FOR MOTOR PROPELLED VEHICLES OR IMPLEMENTS.
APPLICATION FILED MAR. 29, 1919.
1,355,850.
Patented Oct. 19, 1920.
4 SHEETS—SHEET 1.
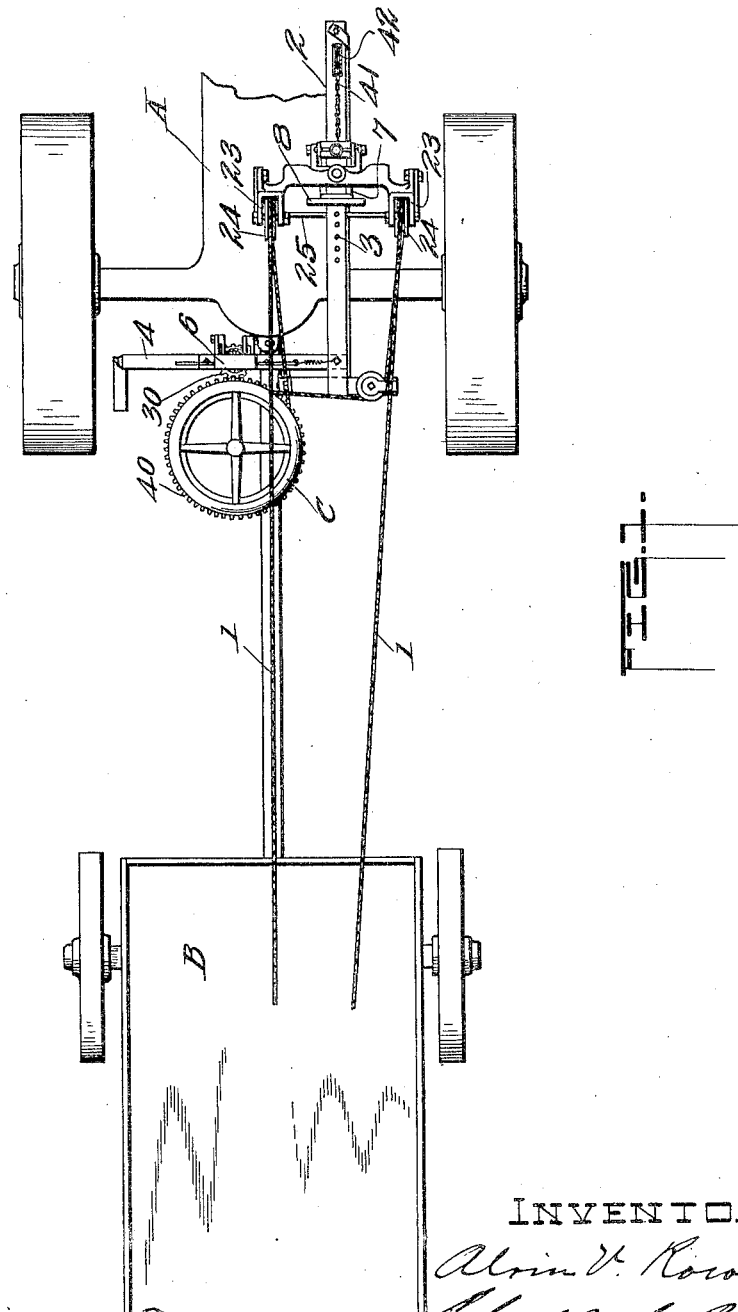
INVENTOR.

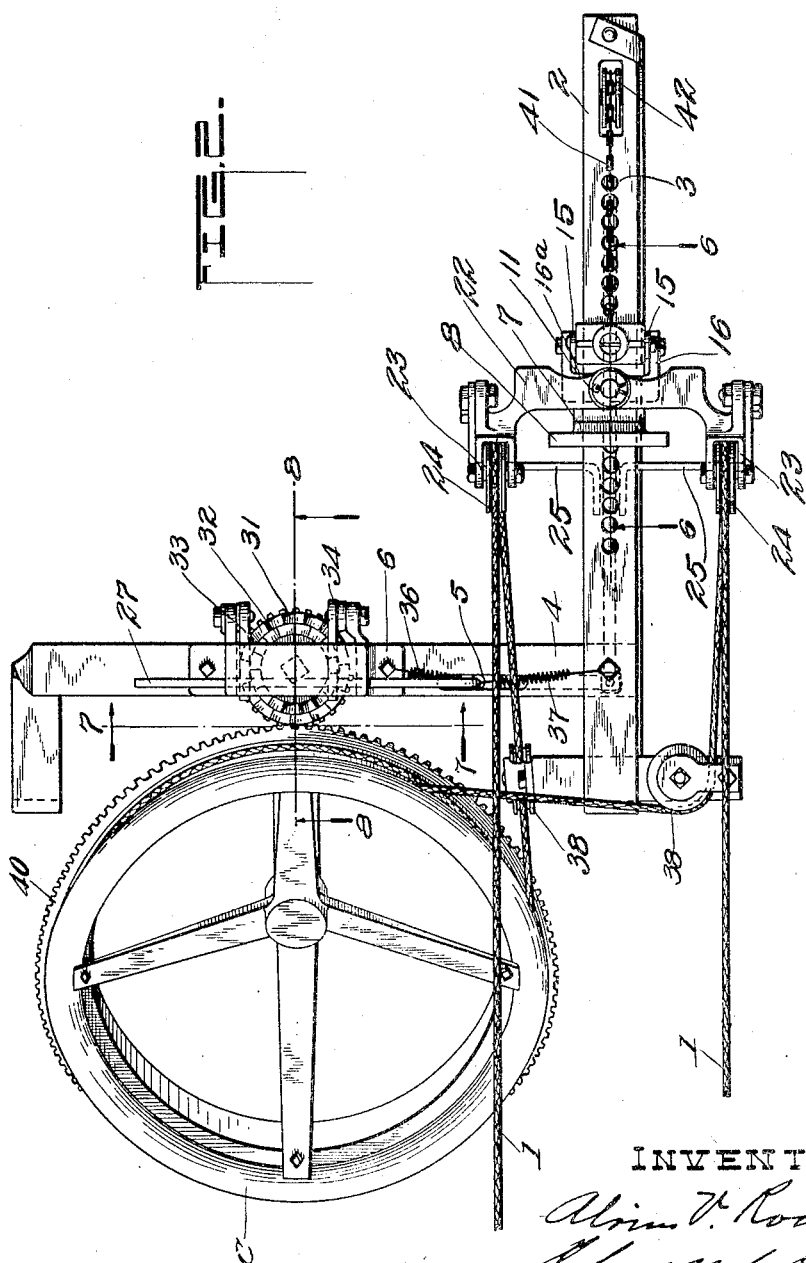

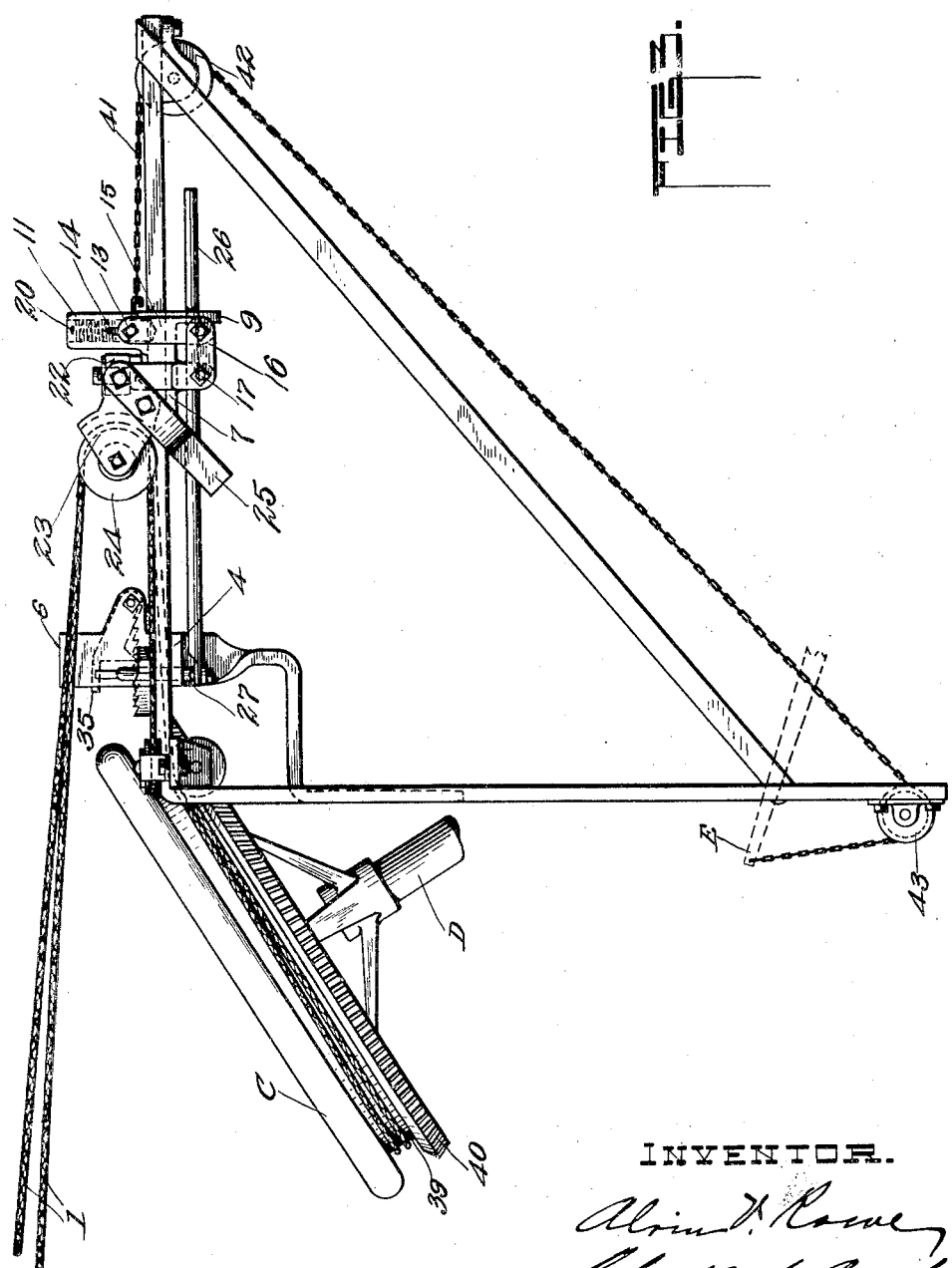

A. V. ROWE.
LINE DRIVE ATTACHMENT FOR MOTOR PROPELLED VEHICLES OR IMPLEMENTS.
APPLICATION FILED MAR. 29, 1919.
1,355,850.
Patented Oct. 19, 1920.
4 SHEETS—SHEET 4.
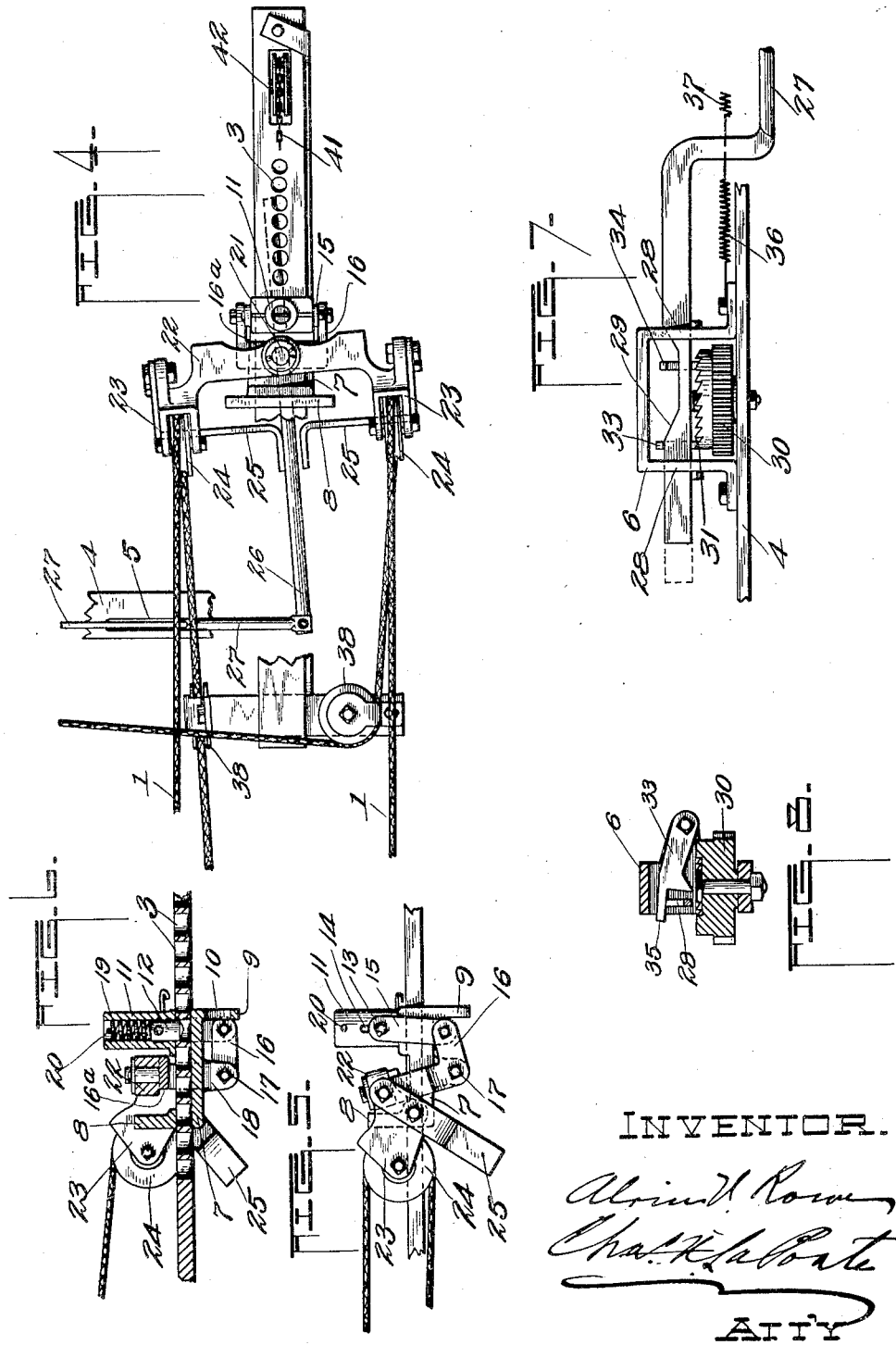
INVENTOR.

UNITED STATES PATENT OFFICE.

ALVIN V. ROWE, OF GALESBURG, ILLINOIS.

LINE-DRIVE ATTACHMENT FOR MOTOR-PROPELLED VEHICLES OR IMPLEMENTS.

1,355,850. Specification of Letters Patent. Patented Oct. 19, 1920.

Application filed March 29, 1919. Serial No. 286,020.

*To all whom it may concern:*

Be it known that I, ALVIN V. ROWE, a citizen of the United States, a resident of Galesburg, in the county of Knox and State of Illinois, have invented new and useful Improvements in Line-Drive Attachments for Motor-Propelled Vehicles or Implements, of which the following is a specification.

This invention has reference to an attachment for motor propelled vehicles, tractors, or implements, including a common control for the "traction-clutch" and the "steering devices."

One of the objects of the present invention is to provide a "line-drive" for motor propelled vehicles or implements, comprising only two "lines" which are operatively connected with means for actuating the lever for operating the "traction-clutch," and which also, are operatively connected with the steering means for operating the "steering devices"; whereby the operator may, through a convenient and simple "line-drive" have under his control the clutch which controls the movement of the vehicle or implement, and also the steering means for controlling the direction of movement of said vehicle or implement.

The invention has for a further object to provide a "line-drive" of the character referred to, where only two "lines" are employed, and where such lines place in the hands of the operator the control of the "traction-clutch," the "steering-devices," and means for locking the steering devices when once set.

My invention differs from certain other attempts to provide a "line-drive" for motor propelled vehicles, or implements, in that the same is not built in and does not form a component part of the vehicle or implement, but on the other hand is made as a separate unit and is employed as an attachment to such vehicles or implements, and may therefore, within certain ranges or modifications be employed as an attachment to different makes of motor propelled vehicles or implements. In the present embodiment it has been designed to adapt the same for attachment to a well known make of motor propelled vehicle. Further, attempts have been made to provide a "line-drive" control and because of the many complications involved in the adaptation of the idea more than two lines have been necessary to operate the various mechanical elements; but, in my attachment, I have so simplified the arrangement and connection of the parts that only two "lines" are necessary, and through these, in a manner similar to driving and controlling a horse, both the "traction-clutch" and the "steering-devices" may be absolutely controlled, and the parts operated with ease and despatch.

Because of the large and various uses to which motor propelled vehicles, or implements have now been put, a "line-drive" has become essential, both as a means of economy and expediency, and in the adaptation of the idea experience has shown that the control must not include more than two "lines" and these lines must have as their function to operate more than one set of mechanical devices, or in other words, control the movement of the vehicle or implement, as well as the direction of such movement.

That the invention may be more fully understood, reference is had to the accompanying drawings, forming a part of the attached specification, in which:—

Figure 1 is a greatly reduced plan view showing part of a tractor and a trailer coupled thereto with my attachment, including "line-drive" associated therewith;

Fig. 2 is a plan view, only, of the attachment;

Fig. 3 is a side elevation, looking at Fig. 2, and in addition, there is shown in dotted lines an element, constituting a hand or a foot lever adapted to have connection with the "traction-clutch" of the motor propelled vehicle or implement;

Fig. 4 is a partial plan view of the attachment, parts shown in the position they must assume when turning the vehicle or implement to the left;

Fig. 5 is a detailed side elevation of parts controlling the "traction-clutch" and showing the position of such parts when moving the "traction-clutch" to inoperative position;

Fig. 6 is a vertical sectional view through the parts shown in Fig. 5, as the same would appear if taken on the line 6—6 of Fig. 2;

Fig. 7 is a detail elevation of parts as they would appear on the line 7—7 of Fig. 2, looking in the direction of the arrows, and Fig. 8 is a detail sectional view as the same would appear, if taken on the line 8—8 of Fig. 2.

Like characters of reference denote corresponding parts throughout the figures.

In Fig. 1, A designates so much of a tractor, as is necessary to illustrate the application of my invention, and B designates a trailer, being any vehicle or implement coupled to the tractor and drawn by the latter, the operator riding on the trailer and controlling the tractor by the two connecting lines 1, 1.

The "line-drive" attachment proper, which consists of a suitable frame structure, and mounted on the chassis or frame of the tractor A, includes a bar 2 having a row of closely associated openings or perforations 3, and a bar 4 disposed transversely to the bar 2, connected therewith and provided with a longitudinally arranged slot 5 near one end. Mounted on the bar 4 is the inverted U shaped yoke 6.

Slidably carried on the bar 2 is a casting 7 having the upstanding transverse stop 8 at its forward end, and the depending transverse extension 9 at its opposite end, the latter part having the large opening 10 therethrough. Upstanding from the front end of the casting 7 is the cylinder like extension 11, the axis of which may be brought into coincidence with the axis of any one of the openings or perforations 3 in the bar 2, and in said cylinder like extension 11 is axially movable the plunger or pin 12 having its lower end tapered or conical shaped to permit it to ride easily into the openings or perforations 3 in said bar 2. The downward movement of the plunger or pin is limited by its contact with the base of casting 7. Through the plunger or pin 12 extends a bolt 13, which also passes out through slots 14 in the wall of the cylinder like member 11 to permit coupling therewith the links 15, which at their lower ends are pivoted to bell-crank shaped arms 16 on casting 16ª, pivoted at 17 to ears 18 depending from the body of the casting 7.

Within the cylinder like member 11 is disposed a coil spring 19 which bears against the plunger or pin 12 and held in position by the pin 20.

Extending cross-wise of the bar 2, above the same and pivoted at 21 to the casting 16ª is a frame 22, which at its opposite ends is formed with yokes 23 in which are journaled the sheave or pulley wheels 24 around which the lines 1, 1, are directed. And to the opposite ends of the frame 22 are secured bars 25 which extend downwardly and rearwardly, bent to extend inwardly to a point approximately centrally beneath the bar 2, then bent to extend normally parallel with the bar 2, the parallel portions of the bars 25, see Fig. 4, being spaced but a short distance apart, and between such parallel portions of said bars is disposed a rod 26, pivoted at its rear end to a cross-rod 27 and its forward portion carried through and having movement in the opening 10 in the depending extension 9 of the casting 7. The cross-rod 27 is bent upwardly passing through the slot 5 in the bar 4, and is then flattened into the form of a bar, see Fig. 7, and passes through and has longitudinal movement in slots 28 in the end walls of the yoke 6, the said bar 27 within the yoke, having the cam-shaped upper edge 29 for purposes to be explained.

On the bar 4, within the confines of the yoke 6 is journaled a gear wheel 30, and the upper surface of this gear wheel is formed with two ratchet rings 31 and 32, the latter being within the former. Contacting with the ratchet teeth of the ring 31 is a ratchet pawl 33 pivoted to one end wall of the yoke 6, see Fig. 2, and contacting with the ratchet teeth of the ring 32 is a ratchet pawl 34 pivoted to the opposite end wall of the yoke 6, see Fig. 2. The pawls 33 and 34 are constructed somewhat as shown in Fig. 8, each having an extension 35 overlying the cam shaped upper edge 29 of the bar 27, the opposite inclined portions of said cam shaped edge adapted, as the bar 27 is moved back and forth to alternately raise the pawls 33 and 34 respectively, from contact with their respective ratchet rings, and thus permit the gear wheel 30 to be rotated in a clock-wise or anti-clockwise direction, as will more fully appear. To the bar 27 are connected springs 36 and 37, both acting to retain the bar 27 in a neutral position with respect to the ratchet pawls 33 and 34.

The lines 1, 1, passing around the sheave or pulley wheels 24 extend to and over or around sheave wheels 38 and thence are passed two or more times around a pulley wheel 39 where they merge into a single strand, as will be understood. The pulley wheel 39 is suitably secured to the steering wheel C, and is provided with the gear wheel 40 meshing with the gear wheel 30. The steering wheel C, as is understood, is connected with the steering post D and it in turn is connected in a customary manner, not shown, with the steering wheels of the motor propelled vehicle or implement, represented by the reference character A.

Connected with the slidable casting 7, on the bar 2, is a chain or similar element 41 which passes over or around a sheave or pulley wheel 42 journaled in the frame of the attachment, and said chain is guided to the foot or hand lever or clutch-pedal E connected to the "traction-clutch," not shown, by a pulley wheel 43, also journaled in the attachment frame. While not shown, it is understood that the lever or clutch-pedal is operated against the pull of a spring, not shown.

Having described a preferred embodiment of the invention as applied to a well known make of tractor, I will now very briefly describe the operation when operating the "traction-clutch" through the lever or clutch-pedal E, and then the operation of the "steering-devices" through the steering wheel C.

Assuming the parts are in position shown in Figs. 1, 2 and 3 and the motor of the tractor is set running and the operator desires to throw the "traction-clutch" into a neutral position, he will pull back on both lines 1, 1, applying an approximately corresponding pull on both lines. This will rock the casting 16ᵃ into the position shown in Fig. 5, oscillating the bell-crank shaped arms 16, lifting the links 15, and raising the plunger 12 out of the opening or perforation 3 in bar 2 and allow the casting 7 to be moved rearwardly on the bar 2, drawing the chain 41 and actuating the lever or clutch-pedal E, to de-clutch the "traction-clutch". This having been accomplished the operator will exert a pull on one of the lines 1 to oscillate the frame 22 until it engages with the stop 8, when he may release the lines to permit the plunger or pin 12 to enter an opening or perforation 3 in the bar 2 to retain the "traction-clutch" in a neutral position. It is understood that the pull of the chain 41 on the lever or clutch-pedal E is against the pressure of a very strong spring (not shown) so by oscillating the frame 22, bringing it against the stop 8 the parts are brought into a position where the operator may release the "lines" slightly to permit the plunger or pin 12 to drop into an opening or perforation 3, without disturbance by the pull of the spring at the "traction-clutch," not shown. To permit the "traction-clutch" to move into operative position, the operator will pull on the two "lines" 1, 1, in manner just previously described to release the plunger or pin 12, then release the lines gradually, the spring (not shown) actuating the lever E to move the "traction-clutch" to operative position, which movement of lever E will draw the chain 41 and the casting 7, and when the clutch is engaged, the plunger or pin 12 will enter an opening or perforation 3 in the bar 2 to lock the parts in operative position, when a loose "line" may be held.

When it is desired to have the tractor follow a straight course the parts are in the position seen in Fig. 2, with the pawl 33 and the pawl 34 locking the ratchet rings 31 and 32, respectively. In this position, there can be no oscillation or rotation of the steering wheel C which could in any way effect the "steering devices." Assuming, however, that it is desired to turn to the left, the operator will pull on the left line 1 which will oscillate the frame 22 swinging it in the direction shown in Fig. 4, and as it turns the left hand bar 25 will bear against the rod 26 causing it to draw the bar 27 to the right, see Fig. 7, causing the cam-like edge to raise the pawl 33, Fig. 8 out of contact with the ratchet ring 31, so that during the further pull on the line the steering wheel may be revolved, the teeth of the ratchet ring 32 riding beneath the pawl 34. It is obvious that a pull on the right "line" 1, in the manner just described with reference to the left "line" 1 would result in turning the tractor to the right; also that the direction of movement of the tractor, whether to the left, or to the right, or in a straight course is very easily regulated through the lines 1, 1, and that when the bar 27 is in a neutral position the pawls 33 and 34 are in locking relation with the ratchet rings 31 and 32 and the "steering-devices" are locked.

It is obvious that various changes might be made without departing from either the scope or spirit of the invention, and therefore, I do not wish to be limited to the precise construction or detail shown, except as I may specifically so limit the same in the appended claims.

What I claim is:—

1. A self contained attachment for tractors to convert same into line-drive tractors, including a supporting frame adapted for bodily securement to the tractor, steering means borne by the frame, means for attachment to the steering means of the tractor, and a two-line-drive connecting the frame steering means and said attached tractor steering means.

2. An attachment for tractors to convert same into line-drive tractors, including a supporting frame adapted for bodily securement to the tractor, means for attachment to the tractor steering means, steering means borne by the frame, means connected to the frame steering means for operating the traction-clutch of the tractor, and a two-line-drive connecting the frame steering means, said attached tractor steering means and the traction clutch.

3. An attachment for tractors to convert same into line-drive tractors, including a supporting frame, drive means for attachment to the usual steering mechanism of the tractor so as to permit direct and selective manual operation of the usual hand steering wheel, steering means borne by the frame, and a two-line-drive connecting the power drive means and said steering means of the frame.

4. An attachment for tractors to convert same into line-drive tractors, including a frame, a device for operating the tractor steering means attachable to the latter, steering means on the frame, locking means on the frame for the frame steering means to lock the latter for either right or left steering, and a two-line-drive connection between said device, the frame steering means and locking means for operating all thereof.

5. A self contained attachment for tractors to convert same into line-drive tractors, including a frame, steering means on the frame, and a two-line-drive connected to the frame steering means and having connection with the steering means of the tractor for operating the latter.

6. An attachment for tractors to convert same into line-drive tractors, including a frame, steering means thereon, means attachable to the steering post for effecting usual turning thereof, and a two-line-drive connecting the frame steering means and said means attachable to the steering post.

7. An attachment for tractors to convert same into line-drive tractors, including a frame, steering means thereon, means connected to the frame steering means for operating the traction clutch of the tractor, and a two-line-drive connected to the frame steering means, and adapted for operating the steering means of the tractor.

8. An attachment for tractors to convert same into line-drive tractors, including a frame, steering means thereon, means connected to the frame steering means for controlling a part of the tractor operating means, and a two-line-drive connected to the frame steering means and adapted for operating said controlling means and for operating the steering means of the tractor.

9. An attachment for tractors to convert same into two-line drive tractors without alteration or disruption of the normal and effective operating parts of the steering means, including a frame attachable to the tractor, steering means on the frame for operating the tractor steering means, a two-line-drive for operating the steering means, and means bodily attachable to an operative part of the steering means without alteration of the latter for effective power driving of the tractor steering means by and upon operation of the two-line-drive.

10. A line-drive for motor propelled vehicles or implements, including in combination, means for actuating the "traction-clutch," means for actuating the "steering-devices," means independent from said last mentioned actuating means for locking said steering devices, and two "lines" operatively connected with each of said actuating and locking means for controlling the movement of the vehicle or implement, for releasing the locking means, and finally for controlling the direction of movement of the wheel or implement.

11. A line-drive for motor propellel vehicles or implements, including in combination, means for actuating the "steering-devices," means for locking said actuating means, and two "lines" operatively connected with said locking means and with said actuating means, whereby the locking means may be released to permit the operation of the actuating means and the vehicle or implement turned to the right or to the left.

12. A line-drive for motor propelled vehicles or implements, including in combination, a reciprocal element adapted to be locked in different positions, means connecting said element with the "traction-clutch," means for actuating the "steering-devices," means for locking said actuating means, and two "lines" operatively connected with said reciprocal element, locking means and actuating means for the "steering-devices"; whereby through the medium of said two "lines," the "traction-clutch" as well as the "steering-devices" and locking means therefor are controlled.

13. In a "line" drive of the character described, in combination with the propelling and steering means, of a reciprocally mounted element, means connecting said element with the propelling means, means to lock the element in different positions, means independent and separate from said first locking means to lock the steering means, means associated with said element to operate said first locking means, and two "lines" operatively connected with said element and said steering means, a pull on the two lines simultaneously, operating said element to control the propelling means, and a pull on either of said lines operating to release the locking means for the steering means, resulting in the steering means being turned either right or left.

14. In a "line" drive attachment of the character described, a support adapted to be mounted on the vehicle or implement, an operating means on said support operatively connected with the "traction-clutch," locking means for the "steering-means," means to operate said locking means from said operating means, and two "lines" operatively connected with said operating means, and said "steering-means."

15. In a "line"-drive attachment of the character described, a support adapted to be mounted on the vehicle or implement, a perforated bar, a casting slidable on said bar, means on said casting adapted to enter the perforations in said bar to lock the casting in different positions, means connecting the casting with the "traction-clutch," means on the casting to actuate the lock, whereby the casting may be removed, and two "lines" connected with said lock actuating means and adapted to operate the lock and move the casting by pulling simultaneously on both "lines."

16. In a "line" drive attachment of the character described, a support adapted to be mounted on the vehicle or implement, a bar, means movable longitudinally of the bar and also mounted to be oscillated thereon, means to lock said longitudinally movable means, means for locking the "steering-wheel," means to operate the locking means from said oscillatory means, two "lines" operatively connected with said oscillatory means and said "steering-wheel," a pull on either of said lines operating to oscillate said oscillatory means, resulting in the release of said "steering-wheel," locking means, whereby the further pull on the line will rotate said steering wheel.

17. In an attachment of the character described, in combination, a perforated bar, a casting slidable thereon, a plunger in the casting, means to yieldingly hold the plunger in any of the perforations in the bar, means pivoted on the casting to raise said plunger, a pair of "lines" connected to actuate the plunger raising means and slide the casting, and connections between the casting and the "traction-clutch."

18. In an attachment of the character described, in combination with the "steering-wheel," of a pivotally mounted bar, means to lock the "steering-wheel," means to operate said locking means from said bar, a pair of "lines" operatively connected with said bar and "steering-wheel," a pull on either of said lines oscillating said bar and releasing said lock, permitting a further pull on the line to rotate said "steering-wheel."

19. In an attachment of the character described, in combination with the "steering-wheel"; of a combined pulley wheel and a gear wheel connected with the steering wheel, locking means for the "steering-wheel" including a gear wheel in mesh with the gear wheel on the steering wheel, a pair of ratchet rings and pawls contacting with the same, a pivotally mounted bar, means to release either of said pawls from said bar, a pair of "lines" operatively connected with said bar and merging into a single strand on said pulley wheel, a pull on either of said lines oscillating said bar to release said pawls, permitting a further pull on the line to rotate said "steering-wheel."

20. A line drive for motor propelled vehicles or implements, including in combination, means for actuating the "traction-clutch," means to lock said actuating means to hold the "clutch" in inoperative position, means for actuating the "steering-devices," means independent and separate from said first locking means to lock said last mentioned actuating means against movement, and a pair of lines operatively connected with each of said actuating and locking means, said lines when pulled back simultaneously adapted to release the lock holding the "traction-clutch" actuating means, permitting the latter to be operated, and when either of said lines is pulled, adapted to release the lock holding the "steering-device" actuating means permitting the latter to be operated.

In witness whereof I have hereunto affixed my hand this 24th day of March, 1919.

ALVIN V. ROWE.